(12) United States Patent
Roesch et al.

(10) Patent No.: US 12,443,784 B1
(45) Date of Patent: Oct. 14, 2025

(54) SYSTEM AND METHOD FOR DUAL MODEL ELECTROMAGNETIC MODELING IN AN ELECTRONIC CIRCUIT DESIGN

(71) Applicant: Cadence Design Systems, Inc., San Jose, CA (US)

(72) Inventors: Claudia Ursula Roesch, Memmingen (DE); Monica Goel, Santa Clara, CA (US); John Yanjiang Shu, Pleasanton, CA (US); Richard John O'Donovan, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 598 days.

(21) Appl. No.: 17/939,479

(22) Filed: Sep. 7, 2022

(51) Int. Cl.
*G06F 30/398* (2020.01)
*G06F 30/392* (2020.01)
*G06F 119/10* (2020.01)

(52) U.S. Cl.
CPC .......... *G06F 30/398* (2020.01); *G06F 30/392* (2020.01); *G06F 2119/10* (2020.01)

(58) Field of Classification Search
USPC ......................................................... 716/115
See application file for complete search history.

(56) References Cited

U.S. PATENT DOCUMENTS 11,288,421 B1* 3/2022 Zhu .......................... G06F 30/20
2021/0312106 A1* 10/2021 Rautio .................... G06F 30/20

* cited by examiner

*Primary Examiner* — Bryce M Aisaka
(74) *Attorney, Agent, or Firm* — Mark H. Whittenberger; Holland & Knight LLP

(57) ABSTRACT

Embodiments include herein are directed towards a method for electromigration analysis of a circuit design. Embodiments may include performing a first transient simulation of an electronic design using one or more electronic design tools. Embodiments may further include storing a level of current associated with one or more generic passive device tap points. Embodiments may also include identifying a resistor capacitor (RC) model for one or more generic passive devices using the one or more electronic design tools and performing a second transient simulation for the one or more generic passive devices. Embodiments may further include analyzing a current density obtained from the first and second transient simulation to obtain a single current density map.

20 Claims, 16 Drawing Sheets

```
/grid/tfo/tools/INTEGRAND62_62.00.000/tools.lnx86/emx/bin/64bit/emx:
(EMX-3008): Process(PID:207568) completed successfully.
EAD: Pegasus completed (EXTRACT) in 12.8
EAD: qrc completed (SUCCESS) in 75.7 (error code: 0)
notify end job: Quantus
notify end job: Update extraction results
notify end extraction job: status
Generated OSPF:
EMX.                                                            ndAs
```

FIG. 15

SYSTEM AND METHOD FOR DUAL MODEL ELECTROMAGNETIC MODELING IN AN ELECTRONIC CIRCUIT DESIGN

BACKGROUND

Various technologies exist for designing and verifying an electronic design, such as the design of an integrated circuit (IC). Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design and verification.

Circuit designers and verification engineers use different methods to verify circuit designs. One common method of verification is the use of simulation. Simulation dynamically verifies a design by monitoring behaviors of the design with respect to test stimuli. For many types of designs, simulation can and should be performed during the design process to ensure that the ultimate goals are achievable and will be realized by the finished product. The exploding demand for high performance electronic products has increased interest in efficient and accurate simulation techniques for integrated circuits. For analog designs, an analog-based simulation approach such as SPICE or SPICE-like simulations (e.g., FastSPICE, HSPICE, PSPICE, or any other SPICE-based or SPICE-compatible simulations) are commonly used to implement simulation of the design. For digital circuit, equivalent digital simulation is performed.

There are many types of electrical analyses that need to be performed to ensure the proper operation of an electronic design. For example, it is often desirable to analyze power distribution networks to check for potential problems relating to IR drops and/or electro-migration effects. Power distribution networks are used to distribute power and ground voltages from pad/package locations to circuit blocks in a design. With continuously shrinking device dimensions, faster switching frequencies and increasing power consumption in deep submicron technologies can cause large switching currents to flow in the power and ground networks, which degrade performance and reliability.

Due to the resistance of interconnects in the power networks, there is a voltage drop across the network, commonly referred to as IR drop. IR drop is a reduction in voltage that occurs on a power net (e.g., a VDD net) in integrated circuits. IC designs usually assume the availability of an ideal power supply that can instantly deliver any amount of current to maintain the specified voltage throughout the chip. In reality, however, a combination of increasing current per-unit area on the die and narrower metal line widths (which causes an increase in the power-grid resistance) causes localized voltage drops within the power grid, leading to decreased power supply voltage at cells and transistors. These localized drops in the power supply voltage decrease the local operating voltage of the chip, potentially causing timing problems and functional failures. IR drop may be both a local and global phenomena. IR drop can be local phenomenon when a number of cells in close proximity switch simultaneously, causing IR drop in that localized area. A higher power grid resistance to a specific portion of the chip can also cause localized IR drop. IR drop can be a global phenomenon when activity in one region of a chip causes effects in other regions. For example, one logic block may suffer from IR drop because of the current drawn by another nearby logic block.

The recent advances in very deep sub-micron (VDSM) integrated circuits (ICs) have brought new challenges in the physical design methodology process of integrated systems. In modern electronic circuits, geometries become smaller; clock frequencies increase; and on-chip interconnections gain increased importance in the prediction of performance. Nonetheless, it has been found that from 0.13 µm and below, ICs are more susceptible to wear-out over time (electromigration or EM), which requires some degree of built-in fault-tolerance and a careful design planning. Meanwhile, increased power demanded on ever shrunk chip size causes higher current densities within the power routing. High currents also induce electromigration (EM) effects in which metal lines begin to wear out during a chip's lifetime. EM is an effect on a circuit caused by movement of ions in a conductor structure, which over time will reduce the effective ability and reliability of the conductor to conduct current from one part of the circuit to another. Electromigration could significantly decrease the reliability of an IC, resulting in possible errors and failures in the IC product. With modern reductions in feature sizes made possible by improving manufacturing processes, the probability of failure due to electro-migration becomes much more possible due to increases of both the power density and the current density of wiring and power structures.

Existing circuit design tools may be used to simulate the current in metal interconnects and may compare current density values against foundry provided limits. This sign-off flow is applied to metal interconnects. Various tools may be used to calculate the current. A current density calculation may be based on the extraction of a physical RC network of the metal interconnect including geometrical (e.g., width, length) and physical information (e.g., material constants of metal layers) of individual parasitic resistors. However, electromigration occurs in any metal, independent of whether the metal is part of the interconnect or part of a device. Metal devices used in RF circuits like inductors or transformers may also suffer from electromigration. Particularly low via count when changing from one metal layer to another may lead to current density hot spots. In RF circuits inductors or transformers are usually modeled by s-parameters. S-parameter models do not allow for the calculation of the current density inside the metal windings.

SUMMARY

In one or more embodiments of the present disclosure, a computer-implemented method for electromigration analysis of a circuit design. Embodiments may include performing a first transient simulation of an electronic design using a one or more electronic design tools. Embodiments may further include storing a level of current associated with one or more generic passive device tap points. Embodiments may also include identifying a resistor capacitor (RC) model for one or more generic passive devices using the one or more electronic design tools and performing a second transient simulation for the one or more generic passive devices. Embodiments may further include analyzing a current density obtained from the first and second transient simulation to obtain a single current density map.

One or more of the following features may be included. In some embodiments, the method may include displaying an overlay of the single current density map with an original electronic design layout. The method may further include performing the second transient simulation includes using the stored level of current as a current source. Performing the first transient simulation may include simulating current through one or more parasitic resistors. Performing the first transient simulation may include calculating a current density inside an interconnect metal device. Performing the second transient simulation may include using an RC model for one or more inductors. Performing the second transient simulation may include simulating current through one or more parasitic resistors. Performing the second transient simulation may include calculating current density inside an inductor metal.

In one or more embodiments of the present disclosure a computer-readable storage medium having stored thereon instructions, which when executed by a processor result in one or more operations is provided. Operations may include performing a first transient simulation of an electronic design using one or more electronic design tools. Operations may further include storing a level of current associated with one or more inductor tap points. Operations may also include identifying a resistor capacitor (RC) model for one or more inductors using the one or more electronic design tools and performing a second transient simulation for the one or more inductors. Operations may further include analyzing a current density obtained from the first and second transient simulation to obtain a single current density map.

One or more of the following features may be included. In some embodiments, the method may include displaying an overlay of the single current density map with an original electronic design layout. Operations may further include performing the second transient simulation includes using the stored level of current as a current source. Performing the first transient simulation may include simulating current through one or more parasitic resistors. Performing the first transient simulation may include calculating a current density inside an interconnect metal device. Performing the second transient simulation may include using an RC model for one or more inductors. Performing the second transient simulation may include simulating current through one or more parasitic resistors. Performing the second transient simulation may include calculating current density inside an inductor metal.

In yet another embodiment of the present disclosure a system for electromigration analysis of a circuit design is provided. The system may include a processor and one or more electronic design tools configured to perform a first transient simulation of an electronic design and to store a level of current associated with one or more generic passive device tap points. The one or more electronic design tools may be further configured to identify an RC model for one or more generic passive devices and to perform a second transient simulation for the one or more generic passive devices. The system may also include a graphical user interface configured to display a current density obtained from the first and second transient simulation as a single current density map.

One or more of the following features may be included. In some embodiments, the graphical user interface displays an overlay of the single current density map with an original electronic design layout. Performing the second transient simulation may include using the stored level of current as a current source. Performing the first transient simulation may include simulating current through one or more parasitic resistors.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 15 illustrates an example log file output consistent with embodiments of the present disclosure.

DETAILED DESCRIPTION

Figure 1:
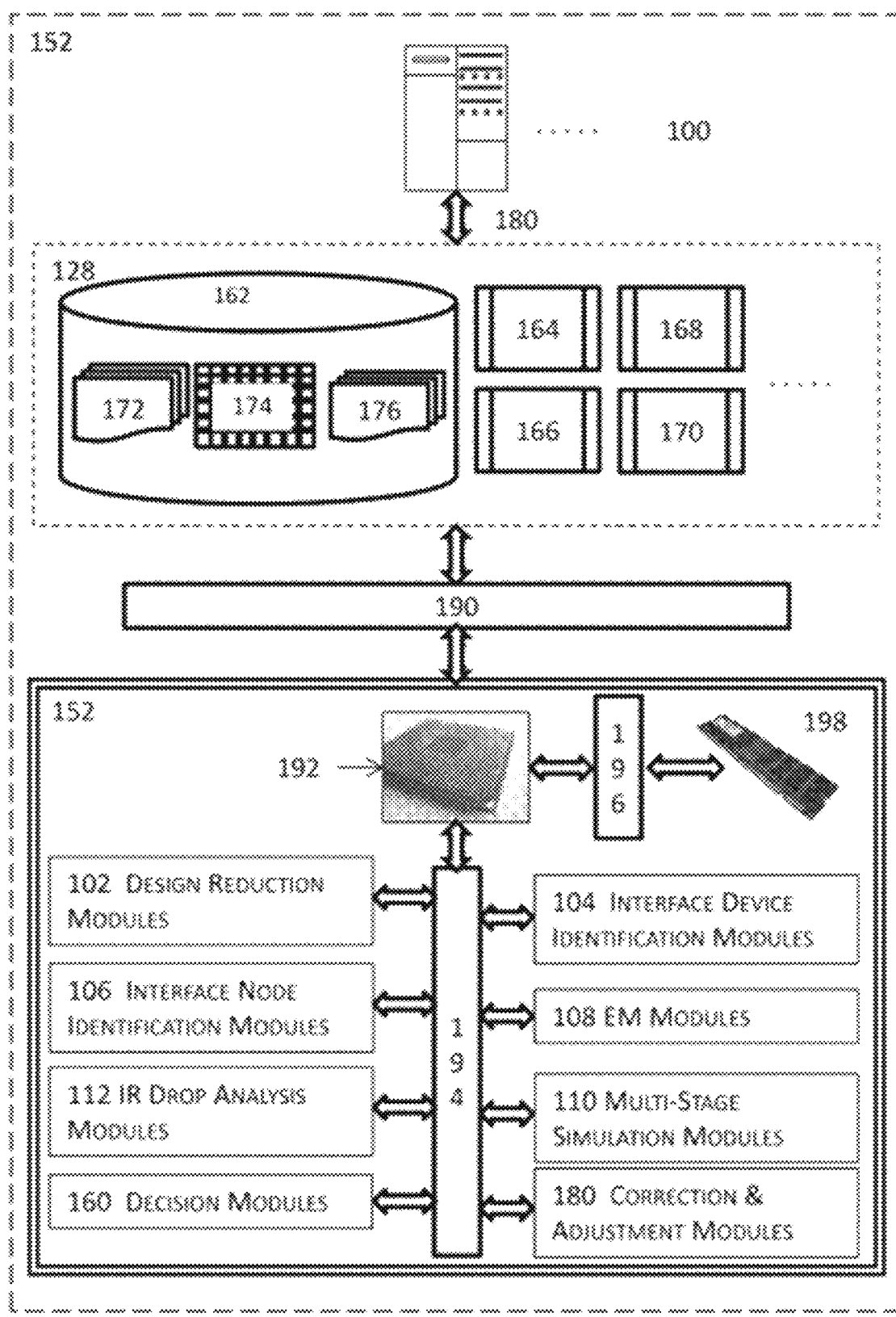
FIG. 1 illustrates a high level block diagram of a hardware system for implementing an electronic design using a dual-mode modeling process in one or more embodiments.

Parasitic extraction and electromagnetic techniques are required when circuits become electrically large and require physical structures to be considered as distributive rather than lumped structures. For low frequency parasitic effects of interconnects are captured using a parasitic extraction engine. The result is an RC network. At higher frequencies three dimensional EM full wave solvers may be used for better accuracy at the expense of longer run time. In larger, more complex RF designs both approaches may be combined to optimize the speed vs accuracy trade-off.

In some embodiments, a highly accurate electromagnetic simulator may be used for any RF critical part of the design, which may provide an EM model (e.g., an s-parameter file) as an output. A parasitic extraction tool may also be used for less RF critical parts of the design, which may provide an RC network as an output.

Various embodiments are directed to a method, system, and computer program product for electromagnetic modeling in an electronic design. In some embodiments, the present disclosure may allow for a dual modeling approach for use in electronic design simulation. Other objects, features, and advantages of the invention are described in the detailed description, figures, and claims.

For accuracy reasons, RF designers want to model passive metal devices, some of which may include, but are not limited to, capacitors, inductors, transformers, etc. as nports using s-parameters. An nport is a scattering parameter (s-parameter) based distributed multi-port element (n=number of ports) that is widely used in circuit simulations. Linearized networks can be completely characterized by parameters measured at the network ports without regard to the contents of the networks. Existing electromagnetic solvers provide an integrated solution to extract s-parameters for passive structures using various EM simulations. Passive devices are mostly metal devices. Electromigration may occur inside the device metals. In particular, low via count inside the device is a risk for high-current density hotspots and must be detected.

Existing power integrity tools provide electromigration analysis for interconnects. Electromigration analysis with these tools requires a physical model. It cannot be applied to nport models. The phrase "physical model", as used herein, may refer to an extracted RC network for a metal device. Resistors may be mapped to metal shapes in the layout. Capacitors may represent the coupling between the metals. This approach maps standard parasitic extraction for interconnects to metal devices.

Accordingly, embodiments of the electromigration analysis process described herein provide an integrated flow using a dual model approach to include the metals inside passive components for electromigration analysis without any loss in accuracy. The dual model approach treats passive metal devices partially as a device and partially as an interconnect. To correctly capture currents in RF circuits passive metal devices must be extracted using an electromagnetic solver. The result is an s-parameter file ($1^{st}$ model). However, in order to calculate current density inside the device metals a physical model is required ($2^{nd}$ model). Embodiments included herein may utilize an electromagnetic solver (e.g., EMX available from the Assignee of the present disclosure), which may include a mechanism to define electromagnetic models, launch the solver, and use the results (e.g., Virtuoso Electromagnetic Solver Assistant available from the Assignee of the present disclosure) and an electromagnetic simulation (e.g., EMX), in-design parasitic extraction tools (which may include layout-versus-schematic and parasitic extraction capabilities) to extract s-parameters and to extract a physical model, and a new multi-stage simulation flow (e.g., Spectre available from the Assignee of the present disclosure) for EM/IR analysis. It should be noted that any reference to particular electronic design tools are provided merely by way of example as any suitable tools and/or methodologies may be used without departing from the scope of the embodiments included herein.

Additional information regarding the subject application may be found in U.S. Pat. Nos. 8,595,677, 8,954,917, 10,216,887, and 10,395,000, which are each incorporated herein by reference in their entirety.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-16.

FIG. 1 illustrates a high level block diagram of a system for implementing an electronic design using voltage-based electrical analyses and simulations with corrections in one or more embodiments. In these one or more embodiments, FIG. 1 illustrates a high level block diagram of a hardware system and may comprise one or more computing systems 100, such as one or more general purpose computers described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms or modules 152 including hardware and software modules or combinations of one or more hardware and one or more software modules that are stored at least partially in computer memory may comprises one or more design reduction modules 102 to reduce a representation of an electronic design (e.g., an RLC network) into a reduced representation such as an RC reduced (or RCR) network, a capacitance only (C-only) network, etc. of the electronic design. The set of modules 152 may further include one or more interface device identification modules 104 to identify interface devices (or tap devices such as current taps).

The set of modules 152 may further optionally include one or more interface or tap node identification modules 106 to identify interface or tap nodes that interconnect one or more interface devices to an electronic design. In addition or in the alternative, the set of modules 152 may further include one or more electro-migration (EM) modules 108 to perform various electro-migration analyses with respect to various EM-related constraints. In some embodiments, the set of modules 152 may further include one or more multi-stage simulation modules 110 to perform multi-stage simulations or analyses on an electronic design of interest with different representations of the underlying electronic design to achieve fast and accurate simulation and/or analysis results.

In addition or in the alternative, the set of modules 152 may comprise one or more decision modules 160 to determine, for example, whether corrections or adjustments to electrical characteristics (e.g., voltages) are to be applied to multi-stage simulations or analyses. The set of modules 152 may also include one or more correction and adjustment modules 180 to identify or determine required or desired corrections or adjustments to one or more electrical characteristics of an electronic design of interest and to apply the required or desired corrections or adjustments to these one or more electrical characteristics of the electronic design of interest.

The set of modules 152 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more modules in the set of modules 152. One or more modules in the set 152 may include or at least function in tandem with a microprocessor 192 via a computer bus 194 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 2:
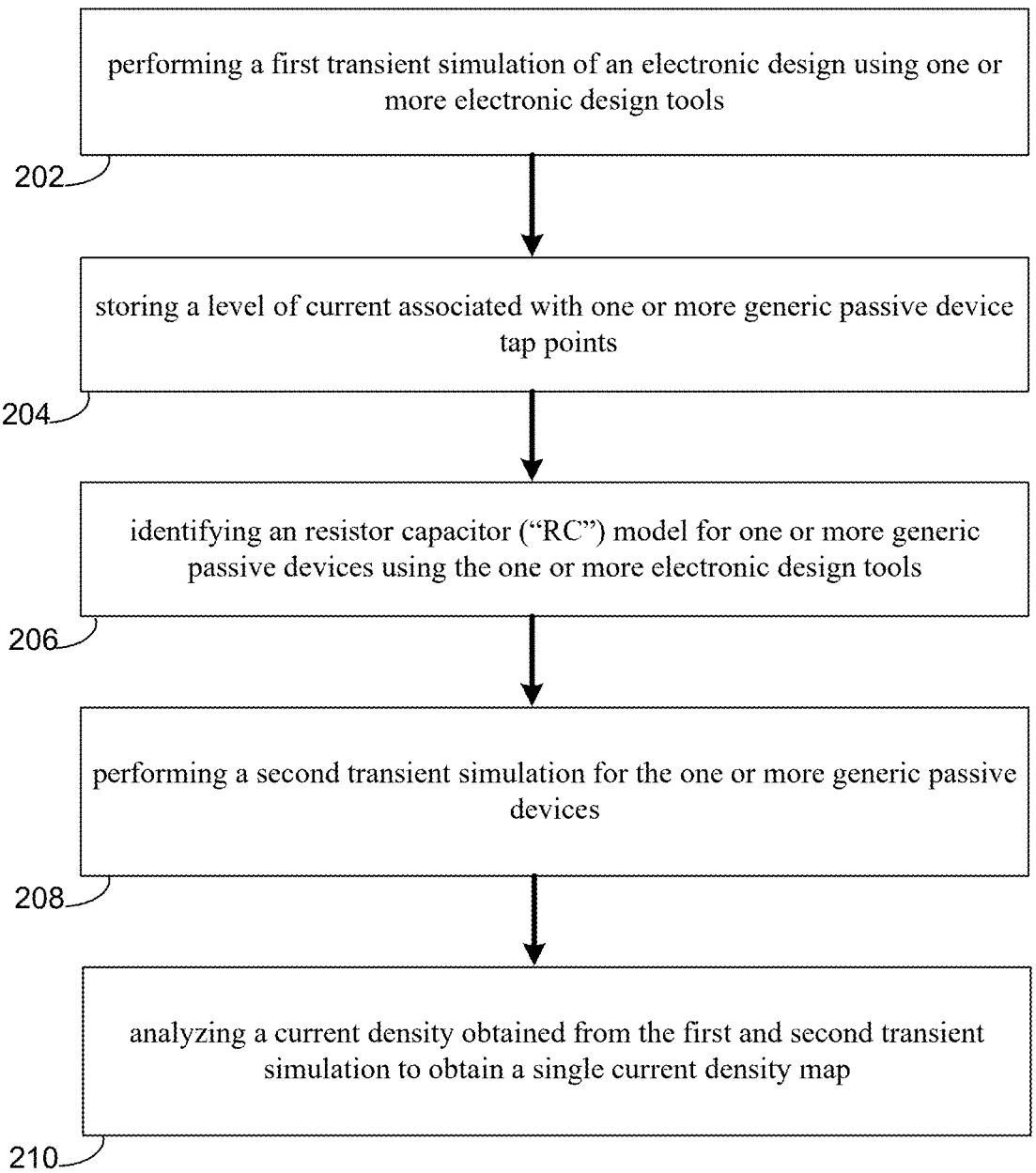
FIG. 2 illustrates a flowchart depicting operations consistent with embodiments of an electromigration analysis process consistent with embodiments of the present disclosure.

FIG. 2 illustrates a high-level flowchart that includes one or more operations that may be employed for use in an electronic design environment is provided. The method may include performing (202) a first transient simulation of an electronic design using one or more electronic design tools. Embodiments may further include storing (204) a level of current associated with one or more generic passive device tap points. Embodiments may also include identifying (206) a resistor capacitor ("RC") model for one or more generic passive devices using the one or more electronic design tools and performing (208) a second transient simulation for the one or more generic passive devices. Embodiments may further include analyzing (210) a current density obtained from the first and second transient simulation to obtain a single current density map. Numerous other operations are also within the scope of the present disclosure.

Figure 3:
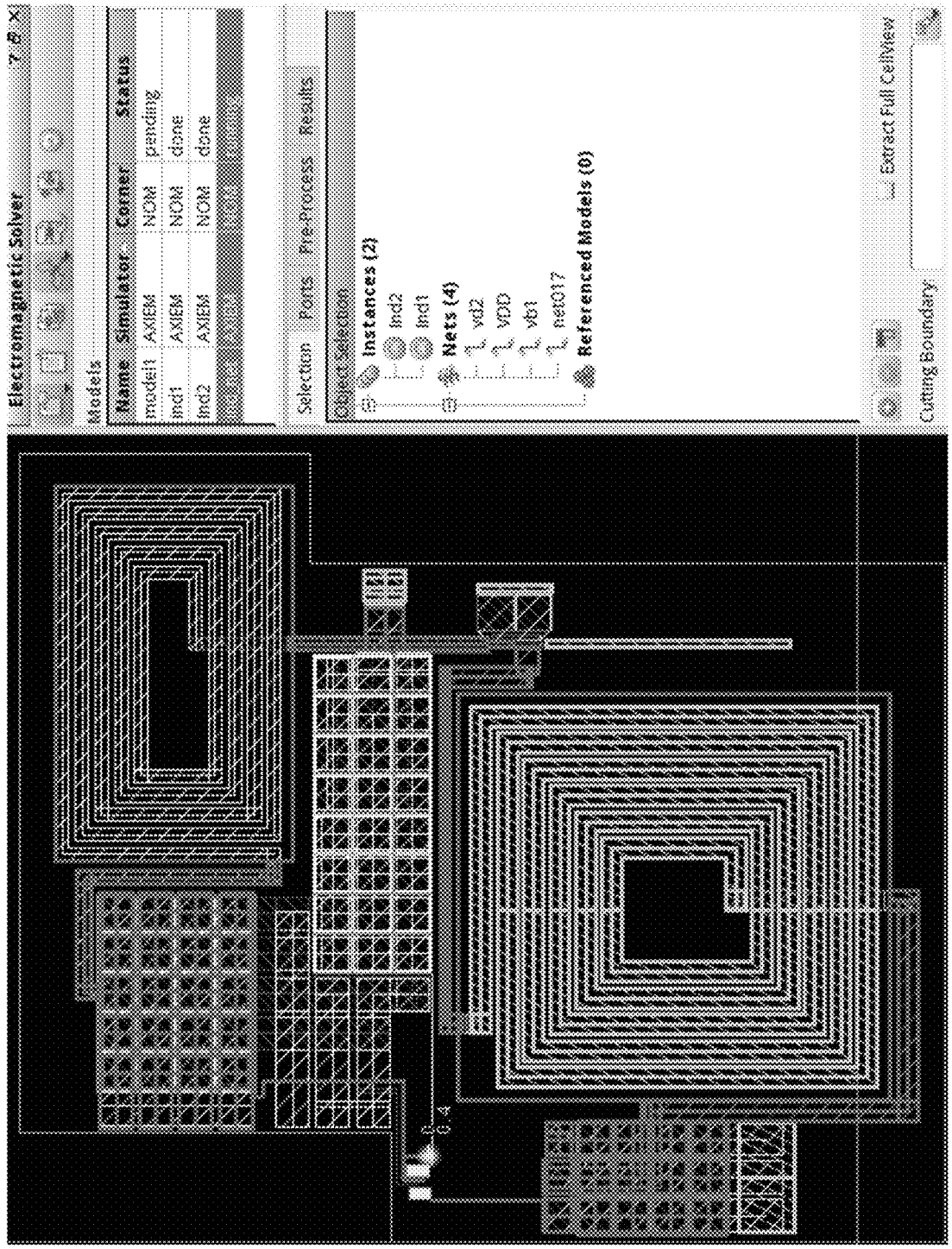
FIGS. 3-5 illustrate examples of graphical user interfaces consistent with embodiments of the present disclosure.
Figure 4:
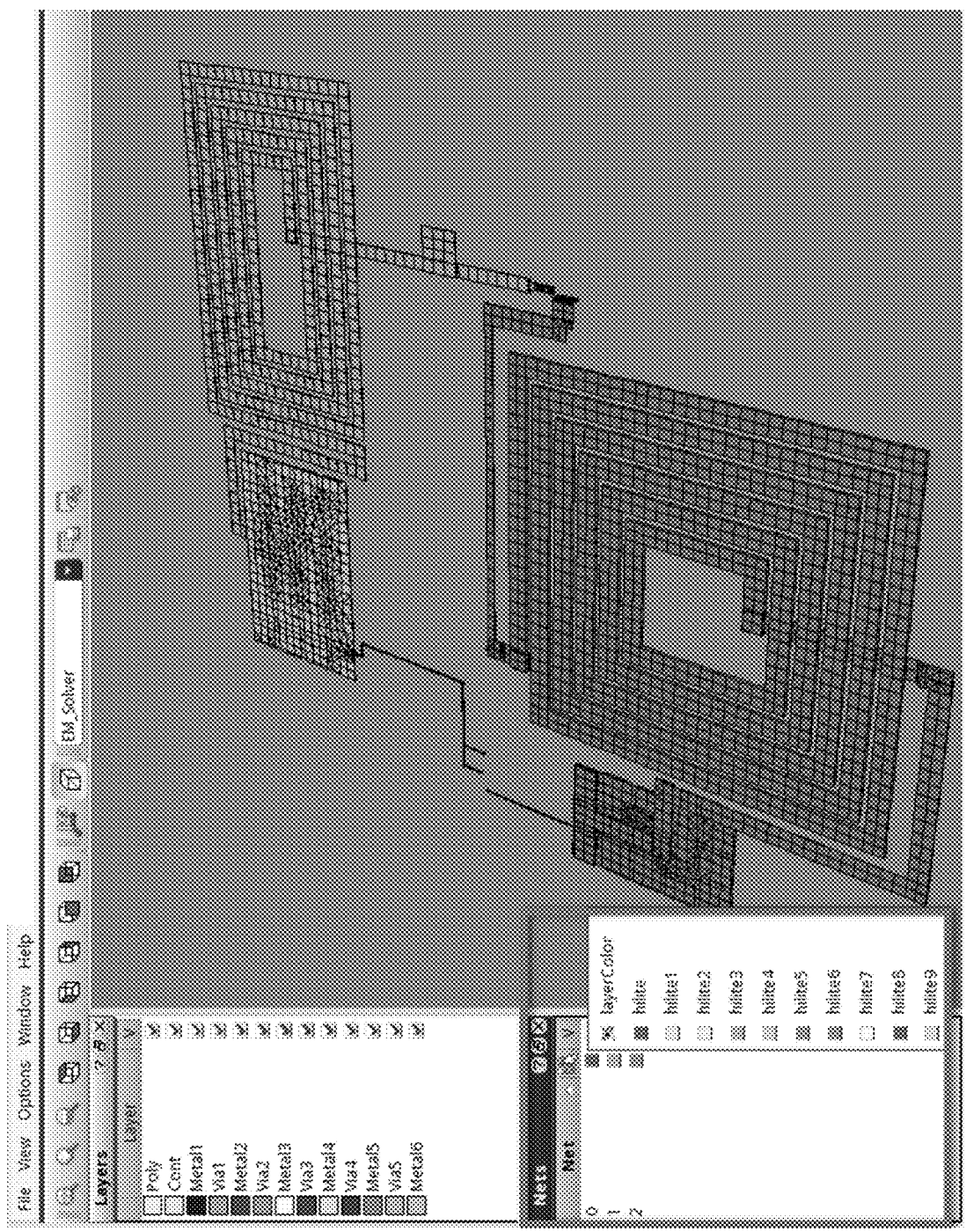
Figure 5:
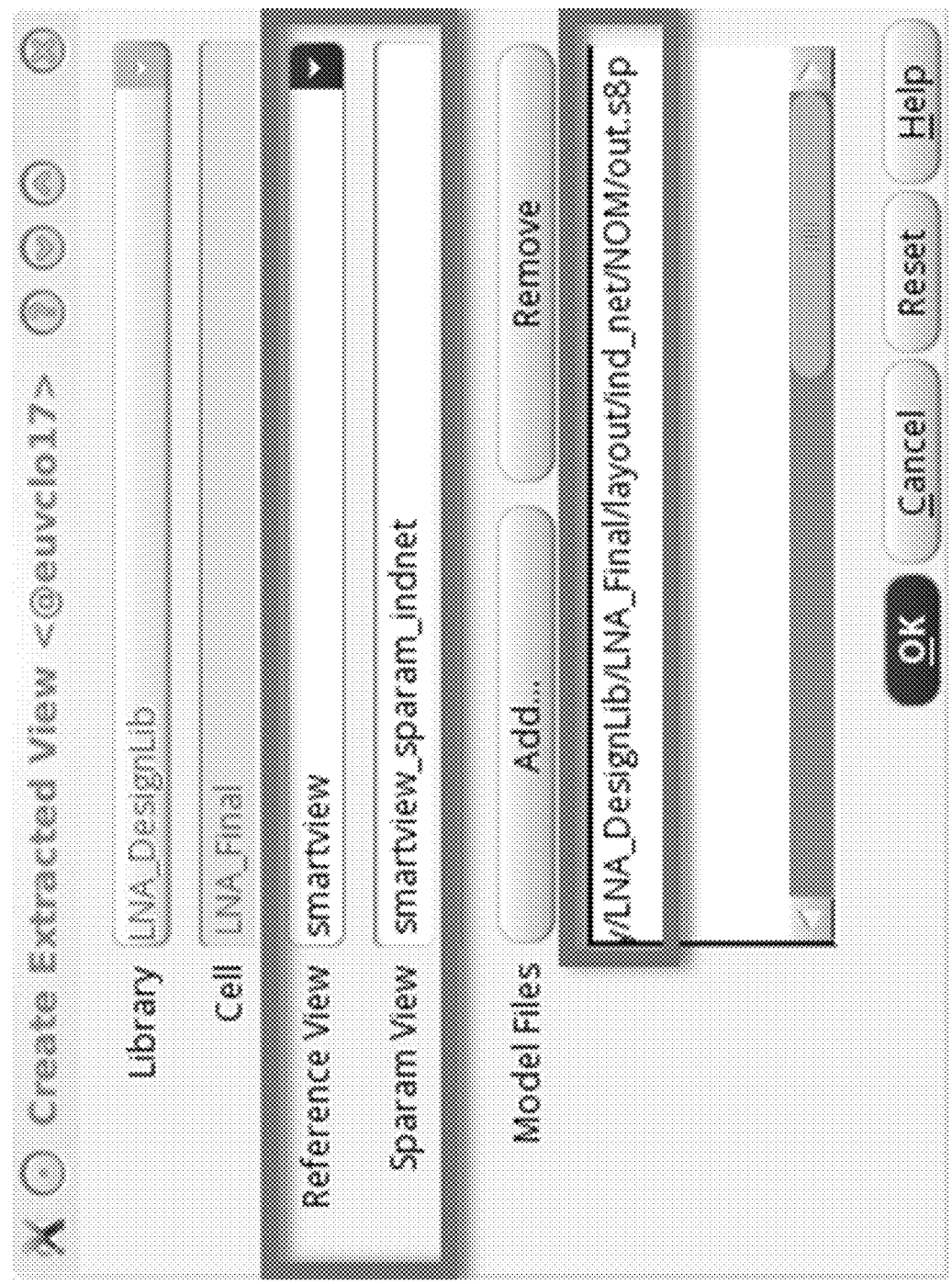

Referring now to FIGS. 3-5, embodiments showing examples of graphical user interfaces showing examples of parasitic extraction and various displays are provided. FIG. 3 shows an electromagnetic solver graphical user interface that may allow a user to perform parasitic extraction. This may include extracting an entire design or selected nets. An electromagnetic simulation may also be performed resulting in the extraction of one or more s-parameter models for RF-components. An electromagnetic view may be generated that replaces one or more RF components and/or generates one or more s-parameter models in the display. Some of these displays may allow a user to select a particular simulation view where they may run a post-layout simulation and/or compare pre-layout and post-layout simulation results. The Electromagnetic Solver Assistant in FIG. 3 allows the user to add instances and nets to an electromagnetic model and launch the electromagnetic solver. Model name, solver, process corner and status for each model may be displayed. FIG. 4 shows the 3D mesh for the electromagnetic model as calculated by the electromagnetic solver. Connected shapes may have the same color. FIG. 5 shows an example graphical user interface that may be used to combine s-parameter models extracted by the electromagnetic solver with the SmartView extracted using the teachings of the present disclosure. The Smartview may include, but is not limited to, designed devices and parasitic devices.

Figure 6:
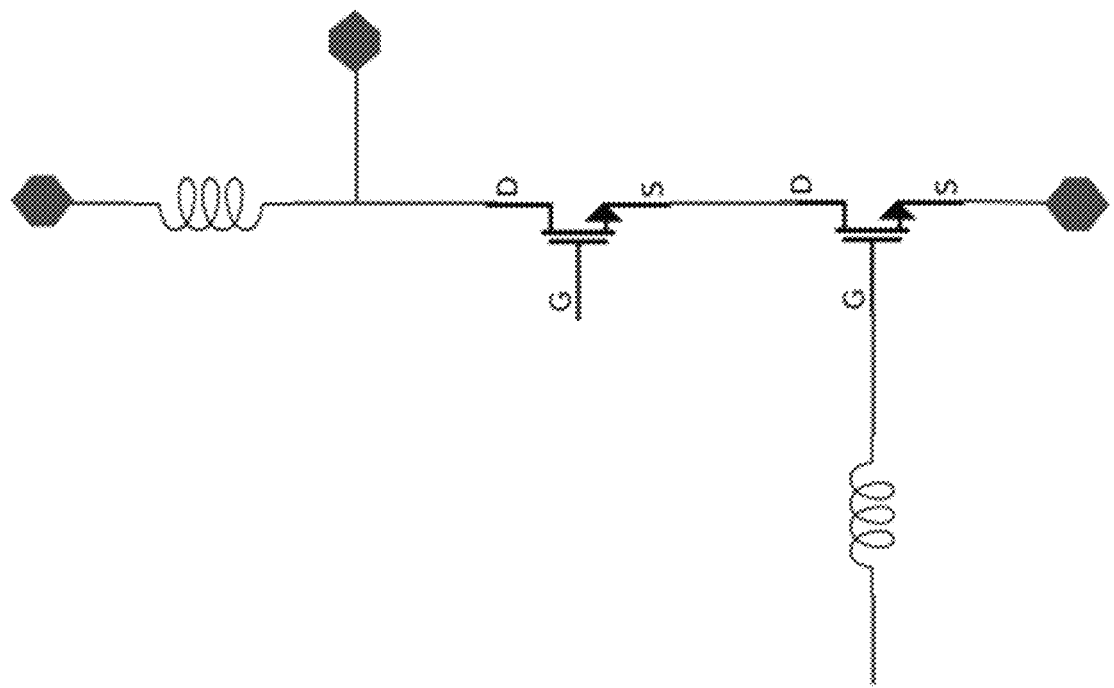
FIGS. 6-7 illustrate examples of circuits consistent with embodiments of the present disclosure.
Figure 7:
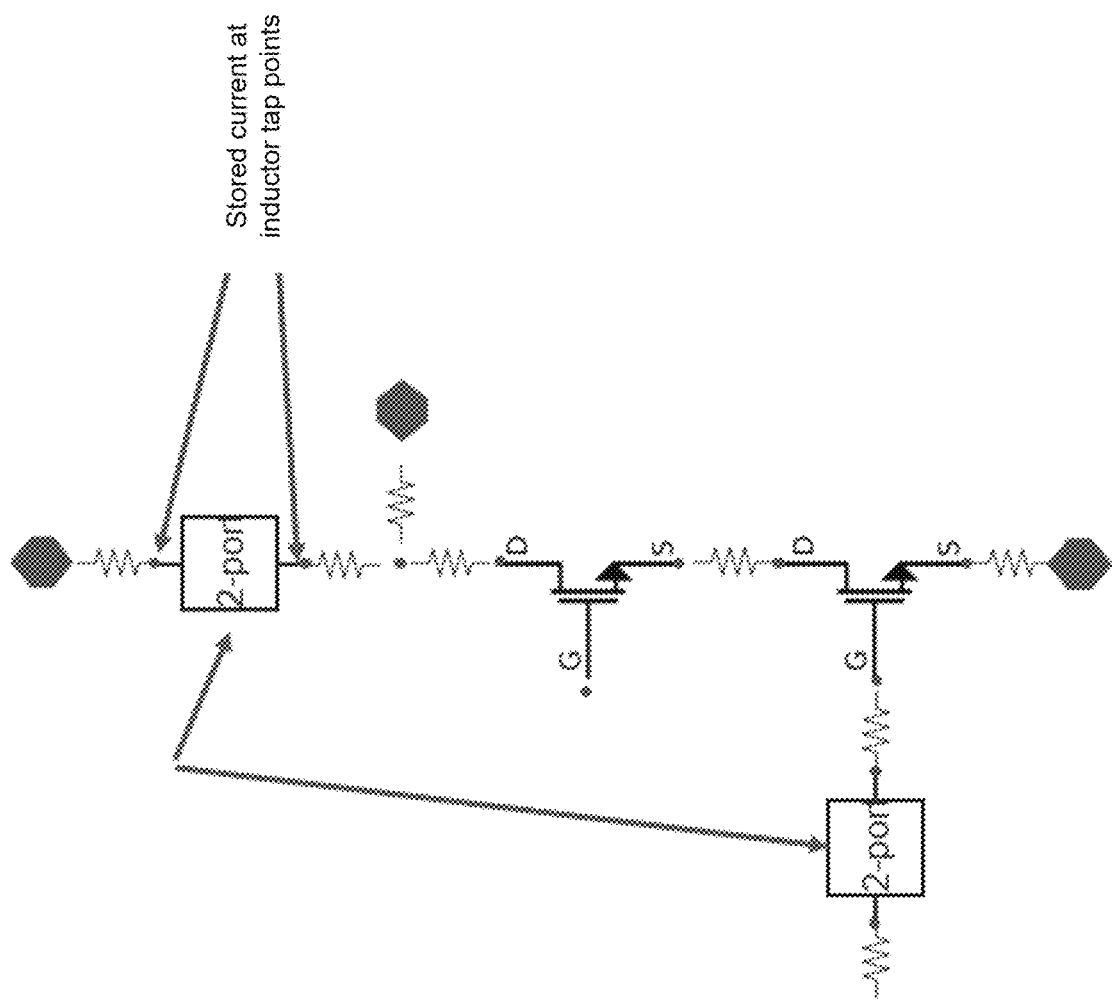

Referring now to FIGS. 6-7, example circuits showing current density calculation in custom passive devices are provided. This example shows a multi-step approach for EM/IR Analysis in Spectre and VoltusFi (each available from the Assignee of the present disclosure). As discussed above, embodiments included herein may utilize physical models wherein an extracted RC network for a metal device is analyzed. Resistors may be mapped to metal shapes in the layout and capacitors may represent the coupling between the metals. This approach maps standard parasitic extraction for interconnects to metal devices.

FIG. 6 depicts an initial circuit or portion of an electronic design and FIG. 7 shows the resulting circuit. In operation, the electromigration analysis process included herein may perform first transient simulation of an electronic design using a first electronic design tool (e.g., Spectre available from the assignee of the present disclosure). Performing the first transient simulation may include simulating current through one or more parasitic resistors and calculating a current density inside an interconnect metal device. The process may further include storing a level of current associated with one or more inductor tap points as is shown in FIG. 7.

In some embodiments, the process may include extracting a resistor capacitor (RC) model for one or more inductors using a second electronic design tool. The electromigration analysis process may include performing a second transient simulation for the one or more inductors. This may include using the stored level of current as a current source and using an RC model for one or more inductors. Performing the second transient simulation may include simulating current through one or more parasitic resistors and calculating the current density inside an inductor metal. The process may include combining a current density obtained from the first and second transient simulation to obtain a single current density map. The process may then display an overlay of the single current density map with an original electronic design layout. FIG. 7 shows an example of the electromagnetic and parasitic extraction, post-layout netlist wherein the parasitic resistors may be partially extracted and the 2-ports may be extracted by EMX. This netlist may be used for the first transient simulation to obtain correct current values. The second transient simulation uses the physical RC network.

Figure 8:
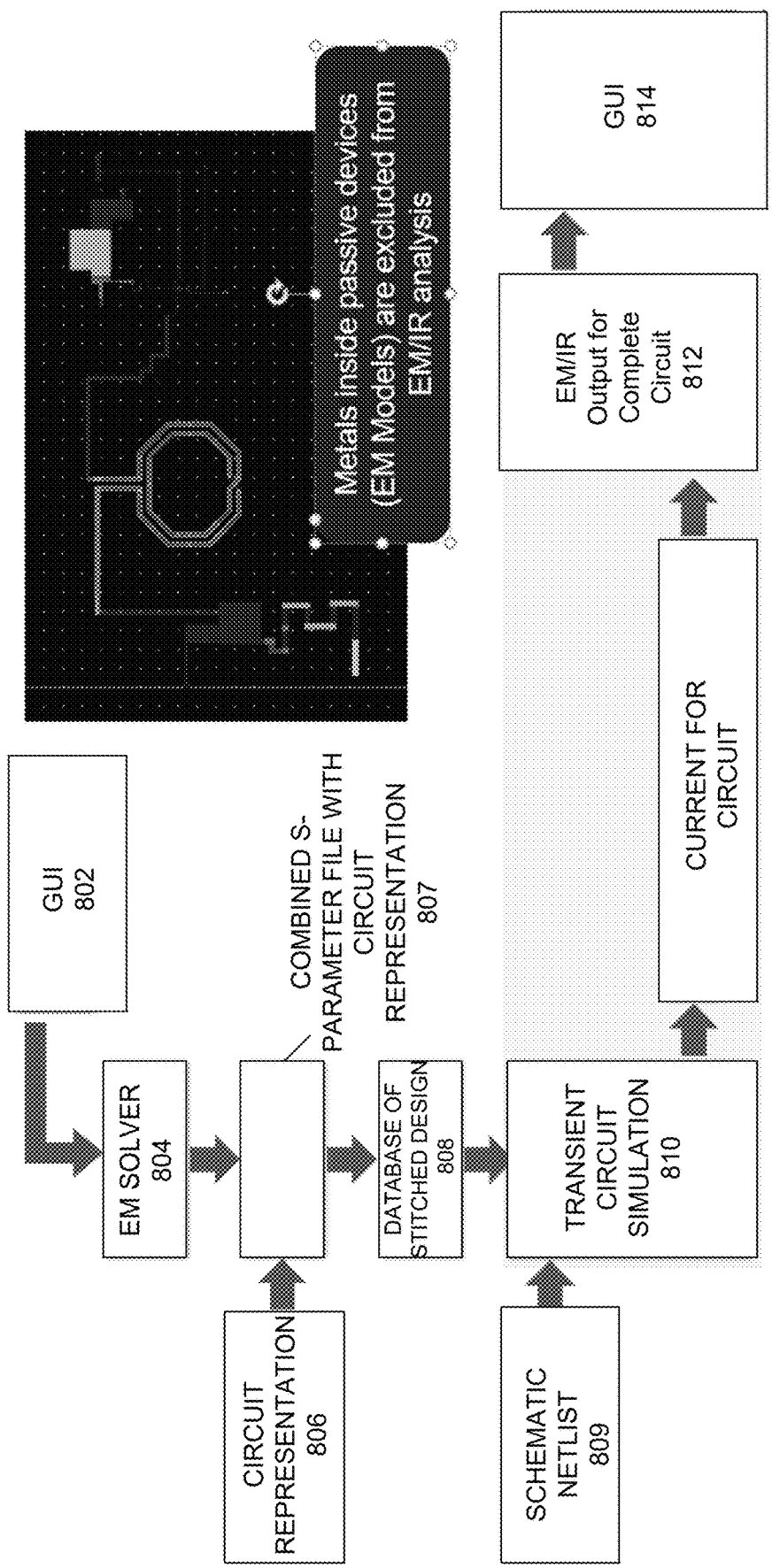
FIG. 8 illustrates an example flowchart and graphical user interface consistent with embodiments of the present disclosure.

Referring now to FIG. 8, a flowchart showing an example analysis for electromigration and IR drop analysis with passive devices is provided. In this particular example, metals inside passive devices (e.g. electromagnetic models) are excluded from the analysis. For post-layout circuit simulation passive metal devices (e.g., inductors, transformers, etc.) can be extracted as devices (e.g., s-parameter models) or as interconnects (e.g., RC-dspf netlist). S-parameter models are highly accurate but cannot be used to calculate current density inside the device metal. RC-netlists can be used to calculate the current density inside the device metal. But they are not accurately capturing the functional behavior of the passive metal device. Post-layout simulation of RF circuits would result in inaccurate current values.

In the example of FIG. 8, a graphical user interface 802 (e.g., VRF EM Model (CLF export)) may be included that may allow a user to define an electromagnetic model. Design components and nets may be selected from the circuit and ports, which may be defined automatically or manually. GUI 802 may allow for the generation of a clf format of the layout to be read by EM solver 804 such as EMX. EM solver 804 may run an electromagnetic solver to extract one or more s-parameter files for the electromagnetic model defined in EM Model from GUI 802. The s-parameter file may be stored using any suitable approach. A representation 806 of the entire circuit (e.g. OpenAccess) may be provided that may include designed devices and parasitic devices as generated by a parasitic extraction tool. S-parameter stitching 807 may occur that may combine the s-parameter file from EM solver 804 with circuit representation 806. Components and nets that are included in the electromagnetic model (defined in GUI 802) may be removed from the database in circuit representation 806 and replaced with the s-parameter results from EM solver 804. The result of s-parameter stitching is stored in stitched design database 808 (e.g. as OpenAccess database). Double-counting of parasitic effects is avoided. Transient circuit simulator 810 may be configured to run a transient circuit simulation and calculate currents. The process may receive physical (e.g. material constant of metal layers) and geometrical (e.g. width, length) information available in circuit representation 806 to calculate current density. GUI 814 may be configured to display a calculated current density heat map and overlay results with initial layout.

Figure 9:
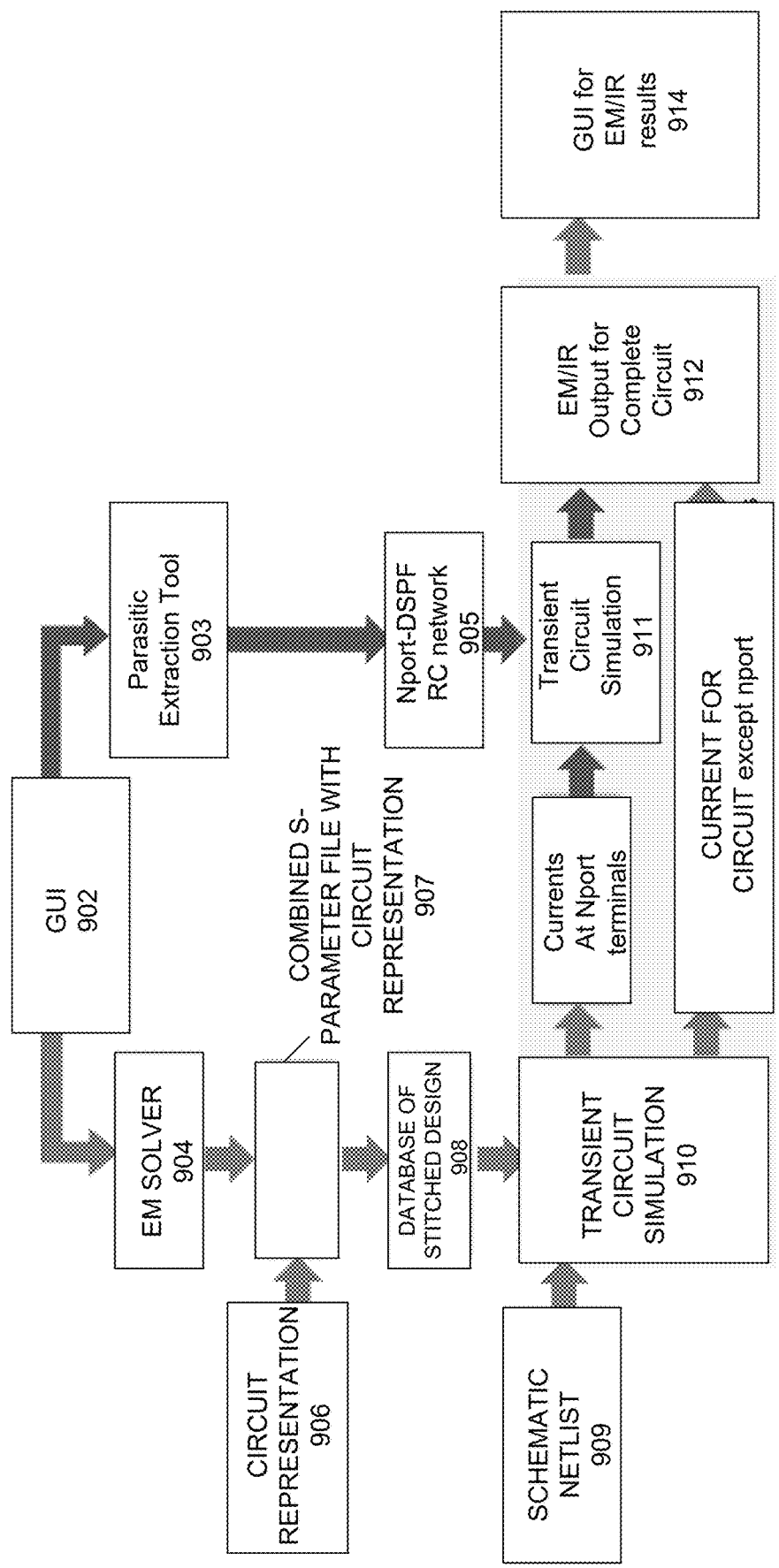
FIG. 9 illustrates an example flowchart consistent with embodiments of the present disclosure.
Figure 10:
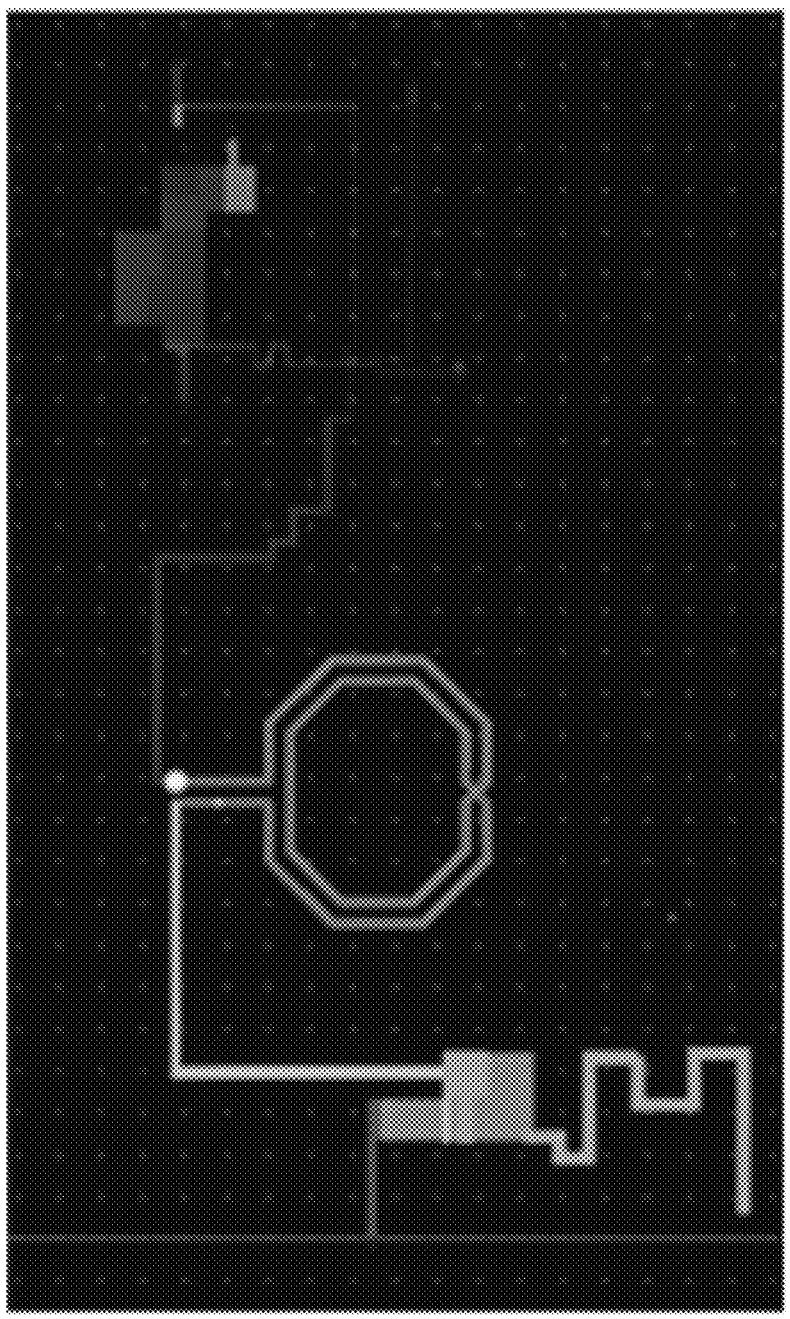
FIG. 10 illustrates a graphical user interface consistent with embodiments of the present disclosure.

Referring now to FIGS. 9-10, flowcharts showing an example for electromigration and IR drop analysis with passive devices are provided. In contrast, to the example of FIG. 8, this example utilizes a dual model approach to address the passive devices. In operation, the process may use GUI 902 that includes a CLF Export tool, which may be configured to export passive metal devices to EM solver 904 and in-design parasitic extraction tools (which may include layout-versus-schematic and parasitic extraction capabilities as described herein). The process may then use EM solver 904 to generate one or more s-parameter models 907. The process may then use an in-design parasitic extraction flow to create a physical RC-model 905 (e.g., in dspf format). The process may use both models for a multi-step EM/IR analysis 910, 911 and subsequent display at GUI 914.

In the example of FIG. 9, an in-design parasitic extraction tool may be configured to perform a Layout-Versus-Schematic (LVS)-parasitic extraction flow to extract an RC-model of the passive component. In some embodiments, only passive devices and nets that are included in the electromagnetic models and exported with CLF Export may be extracted using in-design parasitic extraction. "nport-DSPF" 905 indicates an output RC network generated from the in-design parasitic extraction tool in DSPF format. Transient circuit simulator 910 may include an EM/IR $1^{st}$ stage module that may be configured to perform a transient circuit simulation and calculate currents. Current values may be stored at the nport terminals.

In some embodiments, transient circuit simulator 911 may include an EM/IR $2^{nd}$ stage module that may be configured to utilize currents from the first transient simulation and RC network (from [nport-DSPF 905]) to calculate current density inside the passive device metals. At the EM/IR output tool current density results from the first stage may be combined with current density results from the second stage to a combined current density heat map. GUI 914 may be configured to display the combined current density heat map and overlay the results with the initial layout. The result in FIG. 10 includes metals inside passive devices (e.g. EM models) for EM/IR drop analysis.

Embodiments of the present disclosure extend the dual model approach to multiple generic EM models. The concept of a dual model approach for passive metal devices is extended to generic EM models. The RF circuit may have any number of generic EM models. The two-stage approach for EM/IR analysis in Spectre and Voltus-Fi may be extended to RF circuits with multiple generic EM models. Embodiments included herein provide a new integrated EM/IR analysis flow for RF circuits with passive metal devices. In some embodiments, the present disclosure may also allow for the extension of the dual model approach and two-stage EM/IR analysis for passive metal devices to RF circuits with multiple generic EM models.

Figure 11:
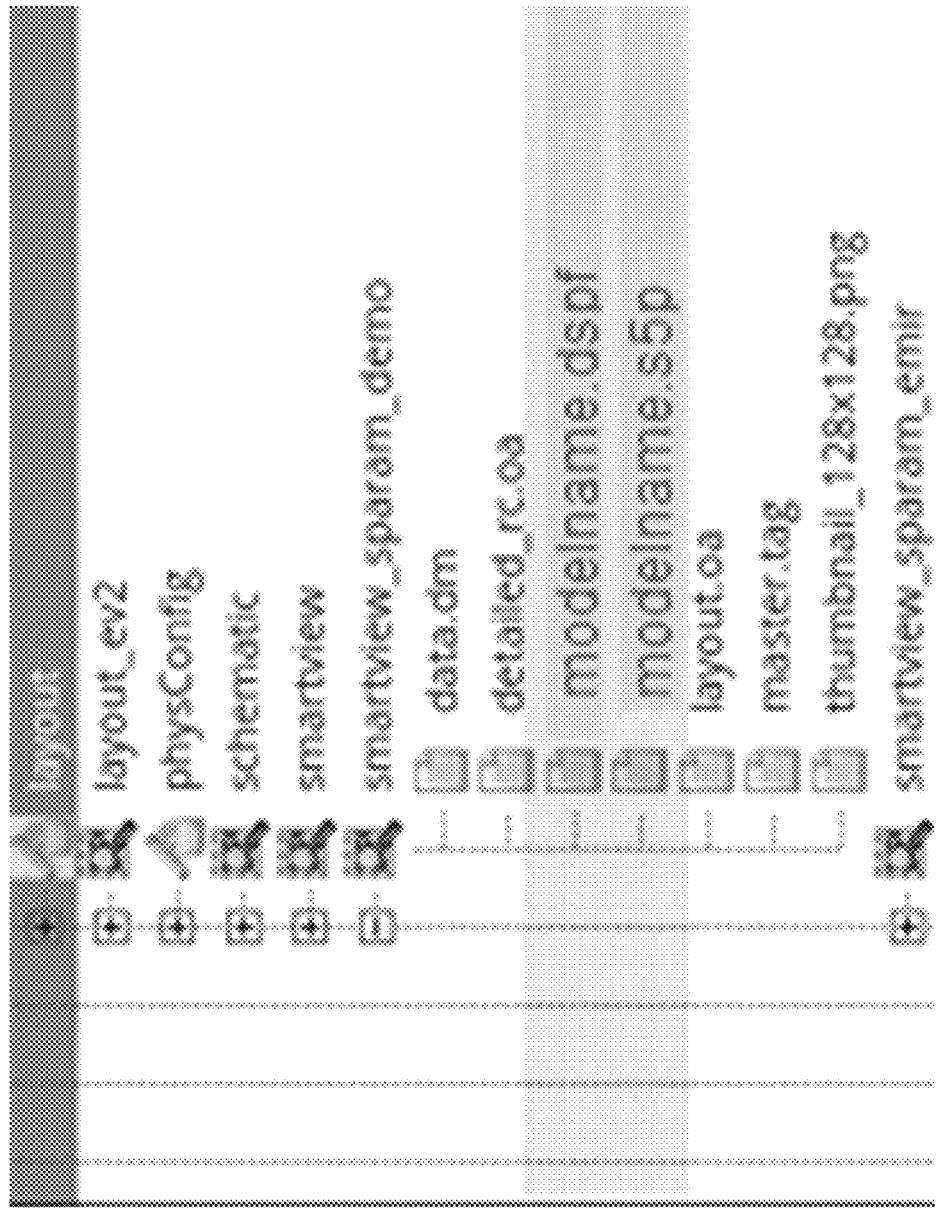
FIGS. 11-14 illustrate graphical user interface examples consistent with embodiments of the present disclosure.

Embodiments of the present disclosure may allow for the generation of two simulation models for the same passive structure. To make use of the teachings of the present disclosure competitive tools or flows may generate two different models for the same passive structure. In some embodiments, the generation of the second model may be triggered with an environment variable. Additionally and/or alternatively, an enablement button in the GUI may be used. The two models need to be synchronized. Accordingly, the process may store the models in the 5x data structure. They may have the same file name but different file extensions as shown in FIG. 11.

In some embodiments, the circuit simulator described herein may use two models for the same passive structure. Accordingly, the circuit simulator may read two simulation models and switch the models after the first step. In some embodiments, a new control statement in the emir.conf file may be used:

spf
    passive_cell_dspf=<dspf_filename>passive_cell_inst=[inst]
  where "<dspf_filename>" points to the second model. In this example, "[inst]" lists the instance name of the component for which the simulation model is switched. Log-files may indicate that a simulation model is exchanged.

Figure 12:
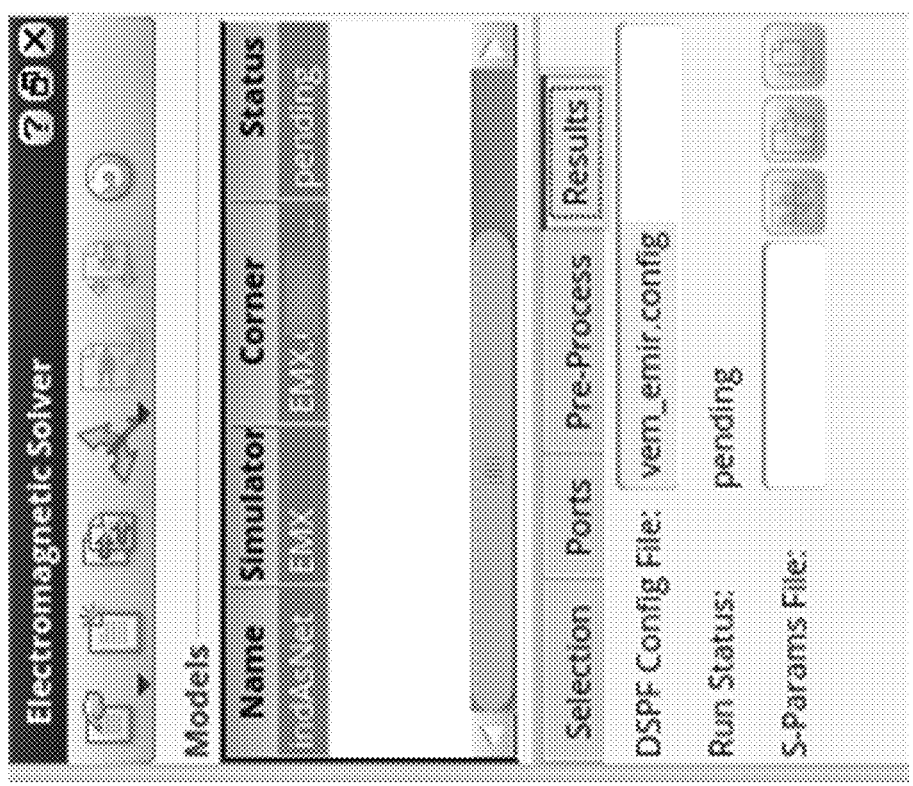
Figure 13:
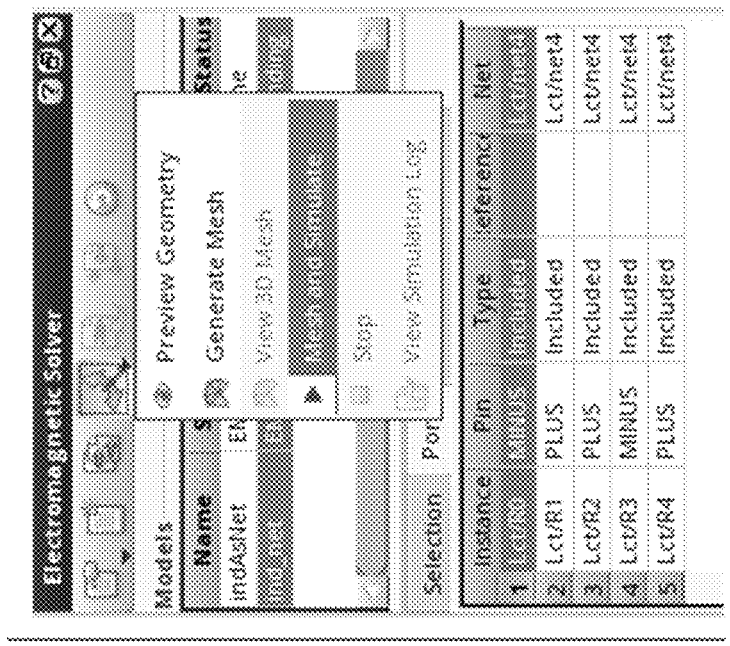
Figure 14:
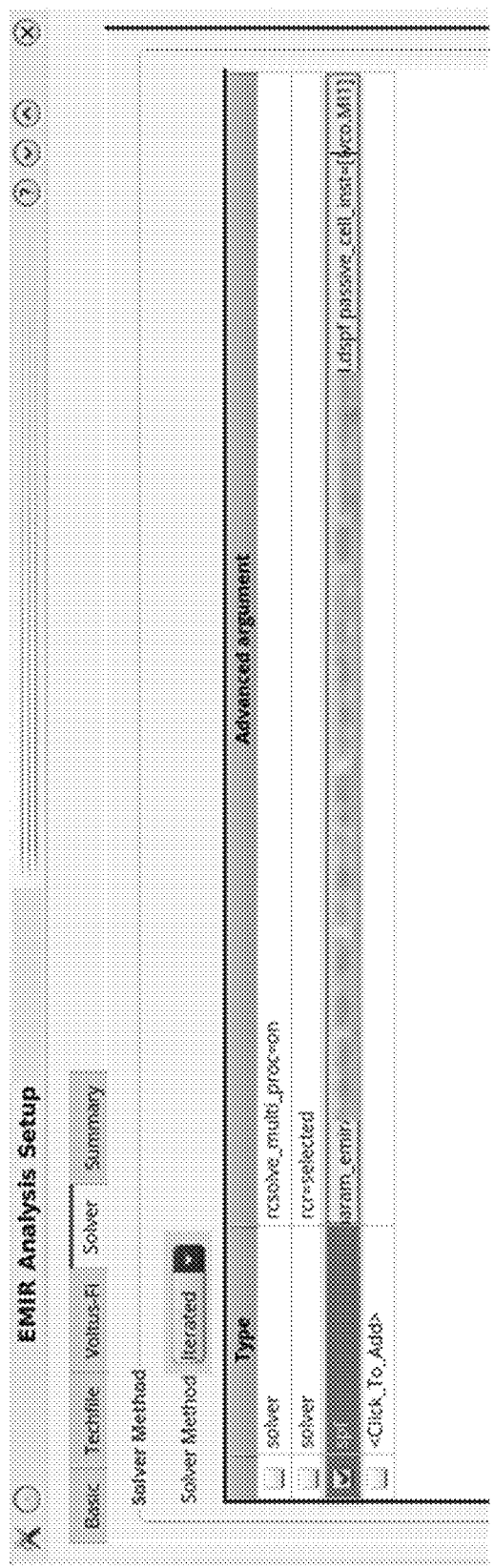

Referring now to FIGS. 12-15, examples of GUIs that may be used in accordance with the present disclosure are provided. FIG. 12 depicts a GUI that may be used to define an electromagnetic model and/or a new .dspf configuration file. FIG. 13 depicts a GUI that may be used to launch a simulation and/or for model generation. This may initiate an s-parameter model tool and an in-design parasitic extraction tool (which may include layout-versus-schematic and parasitic extraction capabilities) that may generate an RC model using a dspf-format. FIG. 14 depicts a GUI that may be used to feed a new dspf netlist to a Spectre simulation and EM/IR analysis. An example log-file output is shown in FIG. 15.

Figure 16:
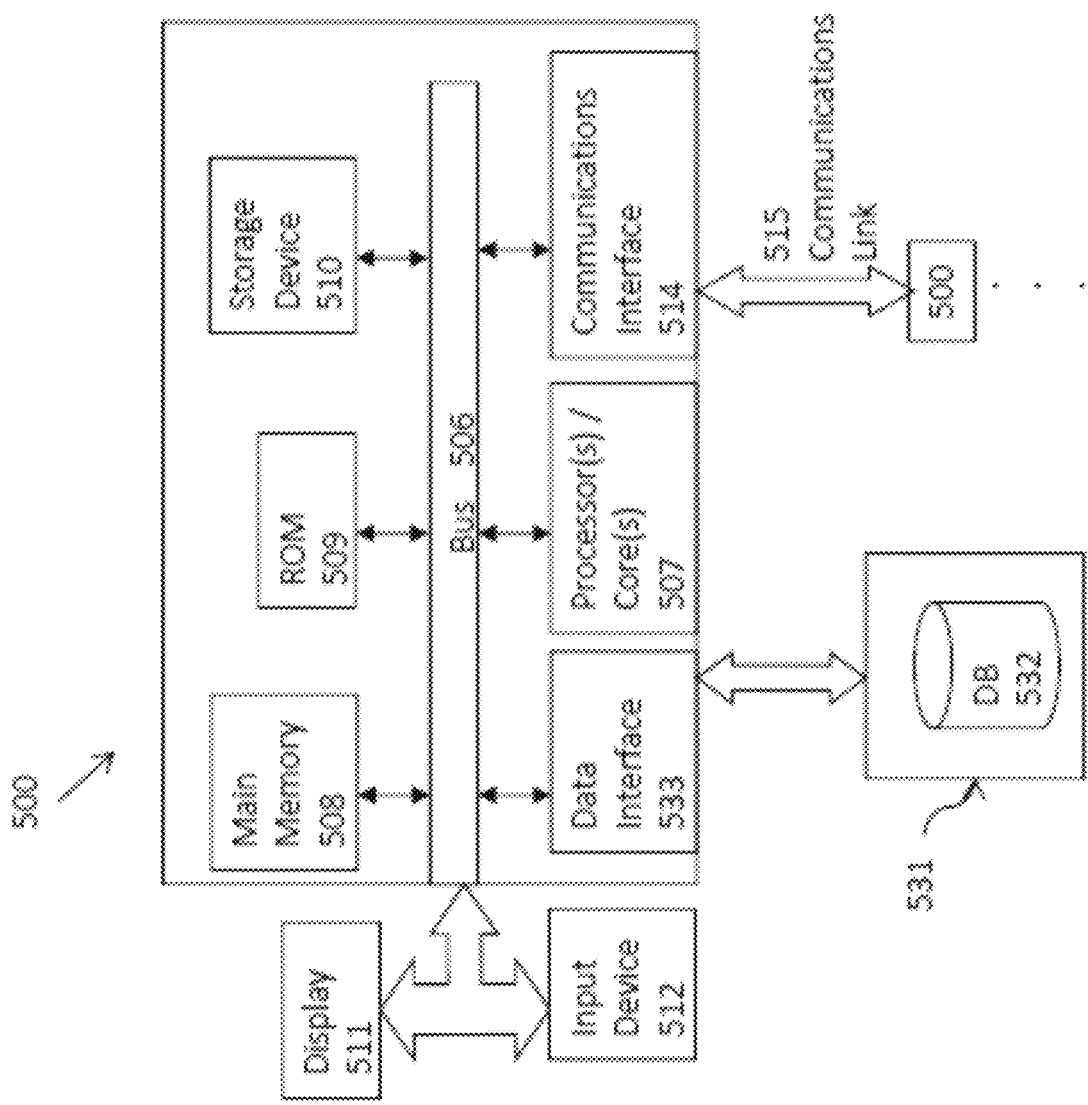
FIG. 16 illustrates a system diagram that may be used to implement one or more embodiments.

FIG. 16 illustrates a block diagram of an illustrative computing system 500 suitable for parasitic extraction as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanism described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, e.g., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 500 may be extended to a cloud-based computing system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for electromigration analysis of a circuit design comprising:
    performing a first transient simulation of an electronic design using one or more electronic design tools;
    storing a level of current associated with one or more generic passive devices tap points;
    identifying a resistor capacitor (RC) model for one or more generic passive devices using the one or more electronic design tools;
    performing a second transient simulation for the one or more generic passive devices; and
    analyzing a current density obtained from the first and second transient simulation to obtain a single current density map.

2. The computer-implemented method of claim 1, further comprising:
    displaying an overlay of the single current density map with an original electronic design layout.

3. The computer-implemented method of claim 1, wherein performing the second transient simulation includes using the stored level of current as a current source.

4. The computer-implemented method of claim 1, wherein performing the first transient simulation includes simulating current through one or more parasitic resistors.

5. The computer-implemented method of claim 1, wherein performing the first transient simulation includes calculating a current density inside an interconnect metal device.

6. The computer-implemented method of claim 1, wherein performing the second transient simulation includes using an RC model for one or more inductors.

7. The computer-implemented method claim 6, wherein performing the second transient simulation includes simulating current through one or more parasitic resistors.

8. The computer-implemented method claim 7, wherein performing the second transient simulation includes calculating current density inside an inductor metal.

9. A non-transitory computer-readable storage medium having stored thereon instructions that when executed by a machine result in the following operations:
    performing a first transient simulation of an electronic design using one or more electronic design tools;
    storing a level of current associated with one or more inductor tap points;
    identifying an RC model for one or more inductors using the one or more electronic design tools;
    performing a second transient simulation for the one or more inductors; and
    analyzing a current density obtained from the first and second transient simulation to obtain a single current density map.

10. The non-transitory computer-readable storage medium of claim 9, further comprising:
    displaying an overlay of the single current density map with an original electronic design layout.

11. The non-transitory computer-readable storage medium of claim 9, wherein performing the second transient simulation includes using the stored level of current as a current source.

12. The non-transitory computer-readable storage medium of claim 9, wherein performing the first transient simulation includes simulating current through one or more parasitic resistors.

13. The non-transitory computer-readable storage medium of claim 9, wherein performing the first transient simulation includes calculating a current density inside an interconnect metal device.

14. The non-transitory computer-readable storage medium of claim 9, wherein performing the second transient simulation includes using the RC model for one or more inductors.

15. The non-transitory computer-readable storage medium of claim 14, wherein performing the second transient simulation includes simulating current through one or more parasitic resistors.

16. The non-transitory computer-readable storage medium of claim 15, wherein performing the second transient simulation includes calculating current density inside an inductor metal.

17. A system for electromigration analysis of a circuit design comprising:
    a processor;

one or more electronic design tools configured to perform a first transient simulation of an electronic design and to store a level of current associated with one or more generic passive devices tap points, wherein the one or more electronic design tools are further configured to identify an RC model for one or more inductors and to perform a second transient simulation for the one or more generic passive devices; and a graphical user interface configured to display a current density obtained from the first and second transient simulation as a single current density map.

18. The system of claim 17, wherein the graphical user interface displays an overlay of the single current density map with an original electronic design layout.

19. The system of claim 17, wherein performing the second transient simulation includes using the stored level of current as a current source.

20. The system of claim 17, wherein performing the first transient simulation includes simulating current through one or more parasitic resistors.

* * * * *